Feb. 19, 1957 W. P. DYKE 2,782,381

FILAMENT VOLTAGE TERMINAL FOR PULSE TRANSFORMER

Filed Jan. 30, 1946

INVENTOR
WALTER P. DYKE

BY M. C. Hayes

ATTORNEY

United States Patent Office 2,782,381

Patented Feb. 19, 1957

2,782,381

FILAMENT VOLTAGE TERMINAL FOR PULSE TRANSFORMER

Walter P. Dyke, Cambridge, Mass., assignor, by mesne assignments, to the United States of America as represented by the Secretary of the Navy Application January 30, 1946, Serial No. 644,394

1 Claim. (Cl. 333—79)

This invention relates in general to an electrical terminal of the type used on transformers and similar apparatus and more particularly concerns a novel terminal structure incorporating an attenuater operative within a predetermined frequency range.

Basically a terminal is a device positioned on or within electrical apparatus and attached to the end of a wire for convenience in making connections. There are many types of terminals in use, the particular structure being dependent upon the nature of the equipment, voltage and current ratings and other factors.

In networks it is often necessary to interconnect apparatus operative within widely separated frequency bands and prevent interaction and spurious response due to stray pickup. Generally this is accomplished by network filters and shielding. In high frequency work, the problem is often complicated by the intermediate nature of lead impedances and the stray fields produced by leads extending to the filters.

My invention contemplates a novel simplified terminal for an electrical equipment which serves as a convenient point for connections and in addition serves as an attenuator operative to provide isolation between connected circuits in a predetermined frequency range.

It is therefore an object of my invention to provide a novel electrical terminal for facilitating circuit interconnection while preventing circuit interaction at other than desired frequencies.

Another object of my invention is to provide a terminal having simplified connection features and incorporating a radio frequency attenuator.

A further object of my invention is to provide a well insulated and moistureproof transformer terminal having negligible electrical loss at power frequencies and extremely high loss at radio frequencies to preclude erratic circuit response resulting from stray field and feedback through power circuits.

Figure 1:
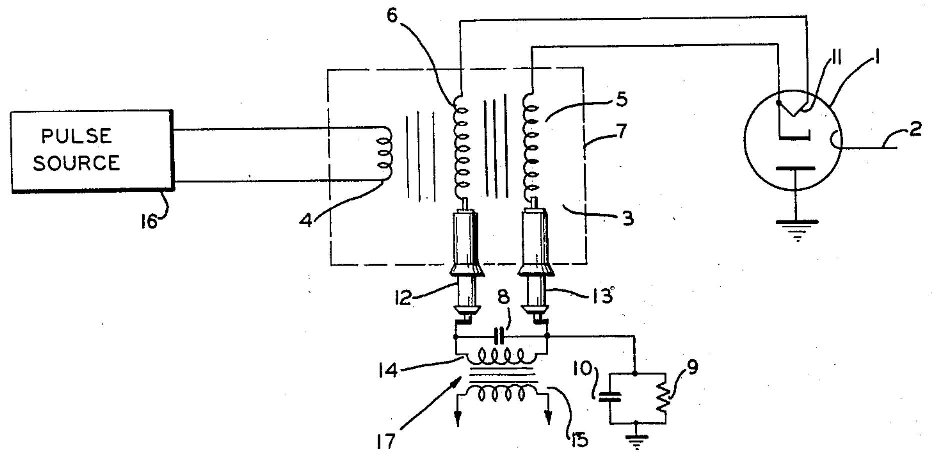
Figure 2:
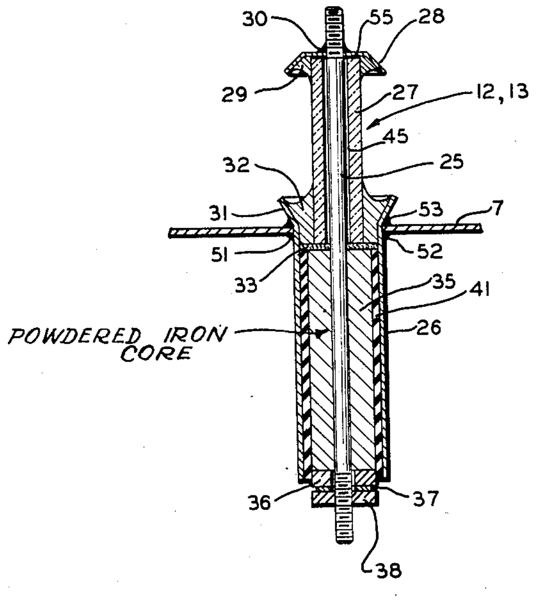

These and other objects of my invention will now become apparent from the following detailed specification taken in connection with the accompanying drawings in which:

Fig. 1 is an example of a pulse generating circuit, presenting the problem of isolation of the high frequency current components of a system, and Fig. 2 is a cross sectional view illustrating the structure of the novel terminal.

As previously described, the requirement of isolation between electrical circuits operative at different frequencies is often encountered. A high degree of isolation is particularly required from high energy circuits such as transmitters which are physically located in the vicinity of or electrically coupled to high sensitivity detectors and receivers. Referring now to Fig. 1, there is schematically illustrated a portion of a high energy impulse generator of the type normally used in connection with radio echo detection apparatus. As is well understood in the art, this type of apparatus has associated therewith a high sensitivity radio receiver which is responsive to faint echoes of a transmitted impulse. In electrical equipment of this type particular care must be taken to preclude feedback from the high energy impulse transmission circuits to the sensitive receiver circuits because impulse feedback will result in a response on an echo indicator, such as a cathode ray tube, which is false relative to the sensitive true echoes. The electrical feedback from one circuit to another may occur through different channels. For example, direct electrostatic or magnetic coupling between circuits may exist as a result of improper shielding. Another source of undesired interstage coupling, which is less readily traced and eliminated, is feedback through the power circuits energizing the affected stages. Network filters may be utilized to eliminate this interstage coupling but generally the filter circuits including leads and components thereof result in considerable coupling in themselves due to the intermediate nature of lead and circuit impedances at ultra high frequencies.

Fig. 1 illustrates the application of my novel terminal structure in preventing interaction between a high frequency transmitter and other associated electrical equipment through the power leads of the stage. Thus the transmitter illustrated in Fig. 1 comprises essentially a magnetron oscillator tube 1 having an output coupling 2 which extends to the radiating structure not shown here. The magnetron anode is grounded and the tube is normally deenergized or non-oscillating. The tube 1 is periodically energized by applying a succession of high voltage negative impulses to the heated cathode thereof. These negative impulses are applied through a pulse transformer 3 which as schematically illustrated comprises a primary 4 and a pair of like secondary windings 5 and 6 within a metallic enclosure 7. The pulse transformer 3 through which the magnetron 1 is periodically pulsed forms no part of the present invention. For a detailed description of the structure thereof reference is made to Patent No. 2,549,366 entitled "Pulse Transformer with Magnetron Well," issued April 17, 1951, to Winston H. Bostick. Briefly, however, this pulse transformer comprises an enclosure which houses the electrical windings and includes a cylindrical well for supporting the magnetron tube.

The magnetron 1 obtains its filament voltage through the pulse transformer. The leads extending from the magnetron heater 11 are connected back to the pulse transformer secondary windings 5 and 6. The opposite ends of the pulse windings 5 and 6 are connected to terminals 12 and 13, which are constructed in accordance with my invention and will be described in greater detail hereinbelow. These terminals 12 and 13 serve as convenient connectors for the filament transformer secondary winding 14, shunted by capacitor 8 and grounded through resistor 9 and capacitor 10. The primary 15 of the filament transformer 17 is energized from the local power source, usually a 60 cycle or a 400 cycle power line.

The primary 4 of the pulse transformer 3 is connected to a pulse forming network 16 which for operation of the particular equipment described, generates high voltage electrical impulses of short duration, for example, of the order of one microsecond. The input impulse is electromagnetically transferred to the secondary windings 5 and 6 which have the same winding direction and are balanced to ground by the proper by-pass capacitors 8 and 10. The secondary windings are connected so that the heater 11 and the cathode attached thereto of the magnetron 1 are driven sharply negative by the applied impulse, the windings 5 and 6 acting in parallel. The magnetron 1 will oscillate under these conditions and transmit a high intensity pulse of radio frequency energy. Insofar as the low frequency heater current is concerned, the transformer secondaries 5 and 6 are of negligible impedance and act in series.

From the above description of the pulse transformer operation, the physical inter-connection between the radio frequency circuits and the low, power frequency filament circuit is apparent. The transformer enclosure and shield 7 eliminates almost entirely external electrical coupling due to direct leakage of electric and magnetic fields. The novel terminals 12 and 13 through which filament voltage is applied to the magnetron 1 eliminate coupling and interaction due to direct feedback through the power circuits. For an explanation of the terminal structure reference is now made to Fig. 2.

The terminal comprises essentially a center conductor 25 and an outer conductive supporting tube 26. The center conductor 25 is threaded at both ends thereof so that a circuit lead having an attached perforated lug may be secured by a nut, not shown. A ceramic tube 27 is positioned upon an end of the inner conductor 25 of the terminal. Narrow cylindrical bands at the ends of the ceramic tube 27 are metallized to enable solder to adhere thereto. The upper end of the ceramic tube is secured electrically and mechanically to the inner conductor 25 by an intermediate, perforated, saucer-shaped metallic member 28 soldered to the metallized ceramic surface at 29 and to the inner conductor at 30. The lower end of the ceramic insulating tube 27 is secured to the flared end 31 of the outer metal cylinder 26 by a bead of solder 32. The solder is confined to the space shown by an asbestos or similar insulating washer 33.

The clearances 55 and 45 between the ceramic insulating cylinder, separating disc 28 and the inner conductor 25 prevents possible shattering of the ceramic cylinder by precluding the development of strains normally occurring because of the unequal expansion characteristics of metal and ceramic. Mechanical strain is further reduced by the cushioning effect of the comparatively soft solder beads which secure the ceramic 27 to the remainder of the terminal structure.

A radio frequency attenuator comprising preferably a powdered iron cylinder 35 of high magnetic permeability is positioned upon the inner conductor 25 below the insulating ceramic 27 and is forced into firm contact with the asbestos washer 33 by the combination of washer 36, lock washer 37 and nut 38. The attentuator powdered iron composition 35 is insulated from the outer metallic cylinder 26 by a cylindrical separator 41 of Bakelite or similar material.

The terminal is mounted upon the pulse transformer as illustrated in Figs. 1 and 2. Thus a perforation 51 in the transformer wall 7 permits the insertion of the outer supporting cylinder 26 of the terminal. A mechanical seal is then established by soldering the terminal to the transformer casing 7 as shown by the circular solder beads 52 and 53. The filament transformer lead is attached in any suitable manner to the top of inner conductor 25, as viewed in Fig. 2, and the end of the transformer secondary winding is attached to the lower end of the conductor 25.

If the transformer is oil filled there is no possible leakage path because of the plurality of solder seals provided, although oil may seep into the inner terminal structure through the internal clearances provided between elements thereof. This oil impregnation improves, to some extent, the insulating properties of the terminal illustrated. As a further consequence of the solder seals between terminal elements and terminal and transformer enclosure, moisture is excluded from the windings therein, maintaining the desired characteristics of the insulation.

At low frequencies, as for example the 60 cycle power frequency used to energize the magnetron heater 11, the terminal illustrated in Fig. 2 presents practically no impedance. At high radio frequencies, as for example, that of the ultra high frequency signal generated by the magnetron, or the radio frequency components of the short duration pulse, the terminal presents a considerable impedance and precludes the transmission of this energy therethrough.

Attenuation of radio frequency signals passing through the terminal is accomplished by the magnetic powdered iron cylinder 35. In the region of this magnetic cylinder, the terminal comprises essentially a coaxial line having an inner conductor 25 and outer conductor 26 separated by a dielectric insulator 41 and a magnetic material 35. The axial conductance of the magnetic cylinder 35 is low due to the powdered construction, and accordingly, current flow through the terminal is substantially confined to the surface of the copper inner conductor 25. The magnetic field within the terminal is cylindrical and is intensified by and concentrated in the high permeability magnetic cylinder 35. Thus at radio frequencies the portion of the terminal containing the magnetic cylinder serves as a high impedance choke. In addition the high frequency alternating magnetic field in the powdered iron results in considerable electrical loss in the form of heat. The combination of inductive reactance and resistance provided by the cylinder 35 of magnetic material effectively prevents high frequency signals originating within the transformer structure from flowing through the terminal and into the secondary 14 of the filament transformer winding. The electrical attenuation at high frequencies may be of 100 decibles for a small terminal.

The exclusion of the high frequency energy from the filament transformer and its electrical power feed system, despite the initial high energy level reduces the chance of incorrect signal response of the associated circuits.

The particular adaptation shown in Fig. 1 of the terminal of Fig. 2 is only an example of the many uses thereof. Of course, different frequency ranges and voltages may dictate other designs for the attenuator and insulating elements. Such modification will be apparent to those skilled in the art, whereby I prefer that the extent of this invention be defined, not by the specific disclosures hereinabove, but by the spirit and scope of the appended claim.

I claim:

A terminal for high frequency electrical apparatus having a metallic shielding enclosure therefor, said terminal comprising a substantially cylindrical hollow conducting support with an outwardly extending flare rigidly fastened to said enclosure and extending inwardly from said enclosure through a mating circular opening, a center conductor threaded at both ends for the attachment of circuit leads, a ceramic insulating tube having metallized bands at its ends positioned at the outer end of said center conductor, a dished metallic disc, the upper metallized band of said ceramic tube being electrically and mechanically secured to said center conductor by soldered connection to said disc, a soft metallic seal, the lower metallized band of said ceramic tube being secured by said metallic seal to said support at said flare, an insulating retaining washer, a hollow cylinder of powdered high permeability magnetic material surrounding said center conductor insulated from and wholly enclosed by said support, said support, said conductor and said cylinder forming a coaxial line over the entire axial length of said cylinder having high frequency attenuation, whereby substantially all electromagnetic field energy flowing through said terminal passes through said magnetic cylinder, high frequency current flow through said terminal being thereby substantially eliminated and low frequency current flow therethrough substantially unaffected.

References Cited in the file of this patent

UNITED STATES PATENTS

| | | |
|---|---|---|
| 1,984,526 | Given | Dec. 18, 1934 |
| 2,368,474 | Keister | Jan. 30, 1945 |
| 2,409,599 | Tiley | Oct. 15, 1946 |
| 2,412,805 | Ford | Dec. 17, 1946 |